(12) United States Patent
Tumen (10) Patent No.: US 7,822,674 B2
(45) Date of Patent: Oct. 26, 2010

(54) METHOD AND APPARATUS FOR DISPLAY OF DATA WITH RESPECT TO A PORTFOLIO OF TRADABLE INTERESTS

(76) Inventor: Steven N. Tumen, 111 W. Jackson, #2000, Chicago, IL (US) 60604

( * ) Notice: Subject to any disclaimer, the term of this patent is extended or adjusted under 35 U.S.C. 154(b) by 749 days.

(21) Appl. No.: 11/418,313

(22) Filed: May 4, 2006

(65) Prior Publication Data

US 2007/0022054 A1    Jan. 25, 2007

Related U.S. Application Data

(60) Provisional application No. 60/678,016, filed on May 5, 2005, provisional application No. 60/700,677, filed on Jul. 19, 2005.

(51) Int. Cl.
G06Q 40/00    (2006.01)
(52) U.S. Cl. .................. 705/37; 705/35; 705/36 R; 705/36 T
(58) Field of Classification Search .............. 705/35–37
See application file for complete search history.

(56) References Cited

U.S. PATENT DOCUMENTS

| | | | | |
|---|---|---|---|---|
| 5,101,353 | A * | 3/1992 | Lupien et al. ................. | 705/37 |
| 6,278,982 | B1 * | 8/2001 | Korhammer et al. ....... | 705/36 R |
| 6,408,282 | B1 * | 6/2002 | Buist ........................ | 705/36 R |
| 7,020,251 | B2 * | 3/2006 | Zirngibl et al. .......... | 379/88.17 |
| 7,089,206 | B2 * | 8/2006 | Martin ........................ | 705/37 |
| 7,330,831 | B2 * | 2/2008 | Biondi et al. ............. | 705/36 T |
| 7,401,048 | B2 * | 7/2008 | Rosedale et al. ............. | 705/37 |
| 7,536,340 | B2 * | 5/2009 | Dheer et al. .................. | 705/37 |
| 2001/0003179 | A1 * | 6/2001 | Martyn et al. ................ | 705/37 |
| 2002/0055886 | A1 * | 5/2002 | Hinckley .................... | 705/26 |
| 2002/0138390 | A1 * | 9/2002 | May ........................... | 705/37 |
| 2002/0156716 | A1 * | 10/2002 | Adatia ......................... | 705/37 |
| 2002/0161690 | A1 * | 10/2002 | McCarthy et al. ............. | 705/37 |
| 2002/0188548 | A1 * | 12/2002 | Bunda ......................... | 705/37 |
| 2003/0046219 | A1 * | 3/2003 | Rosedale et al. .............. | 705/37 |
| 2003/0055664 | A1 * | 3/2003 | Suri ............................. | 705/1 |
| 2003/0065608 | A1 * | 4/2003 | Cutler .......................... | 705/37 |
| 2003/0069834 | A1 * | 4/2003 | Cutler .......................... | 705/37 |
| 2003/0105697 | A1 * | 6/2003 | Griffin et al. ................... | 705/36 |
| 2003/0110113 | A1 * | 6/2003 | Martin ......................... | 705/36 |
| 2003/0139990 | A1 * | 7/2003 | Greco ......................... | 705/35 |
| 2003/0206617 | A1 * | 11/2003 | Zirngibl et al. ........... | 379/88.12 |
| 2003/0212622 | A1 | 11/2003 | Wallman | |
| 2004/0034591 | A1 * | 2/2004 | Waelbroeck et al. .......... | 705/37 |
| 2004/0117292 | A1 | 6/2004 | Brumfield et al. | |
| 2004/0153389 | A1 * | 8/2004 | Lortscher, Jr. ................ | 705/36 |
| 2004/0199450 | A1 | 10/2004 | Johnston et al. | |
| 2004/0254877 | A1 * | 12/2004 | Buckwalter et al. ........... | 705/37 |
| 2005/0036593 | A1 * | 2/2005 | Zirngibl et al. .......... | 379/88.17 |

(Continued)

Primary Examiner—Narayanswamy Subramanian
(74) Attorney, Agent, or Firm—Schiff Hardin LLP (57) ABSTRACT

A computer display and method for displaying trading data for tradable interests includes receiving trade data from one or more exchanges and applying provides filters to the data to display for the liquidity provider/user data that is relevant to the liquidity provider/user's portfolio. The filter removes trading data of tradable interests not in the liquidity provider/user's portfolio and preferably also removes trades of less than a predetermined size. User selected filters permit filtering by exchange, security, date, and trade size. Trade data is displayed in colors to indicate trade status, and exchange, for example.

15 Claims, 7 Drawing Sheets

U.S. PATENT DOCUMENTS

| | | | |
|---|---|---|---|
| 2005/0187855 A1* | 8/2005 | Brennan et al. | 705/37 |
| 2005/0187858 A1* | 8/2005 | Graham et al. | 705/37 |
| 2005/0187862 A1* | 8/2005 | Dheer et al. | 705/39 |
| 2005/0228735 A1* | 10/2005 | Duquette | 705/37 |
| 2006/0173769 A1* | 8/2006 | Vales | 705/37 |
| 2008/0243666 A1* | 10/2008 | Rowan | 705/37 |
| 2009/0089199 A1* | 4/2009 | Waelbroeck et al. | 705/37 |
| 2009/0186689 A1* | 7/2009 | Hughes et al. | 463/25 |
| 2009/0292632 A1* | 11/2009 | Dheer et al. | 705/35 |

* cited by examiner

FROM FIG. 3A

| | | | | | | | |
|---|---|---|---|---|---|---|---|
| KOSP | May05 | 35 | C | 18.60 | 5 | 11 | 10:55 |
| KOSP | May05 | 35 | C | 18.60 | 3 | 6 | 10:55 |
| KOSP | May05 | 35 | C | 18.60 | 2 | 3 | 10:55 |
| KOSP | May05 | 50 | C | 4.40 | 2 | 65 | 10:53 |
| KOSP | June05 | 50 | P | 1.90 | 11 | 31 | 10:52 |
| GSK | May05 | 50 | P | 0.70 | 10 | 171 | 10:52 |
| KOSP | May05 | 50 | P | 0.75 | 30 | 222 | 10:52 |
| KOSP | May05 | 55 | P | 1.55 | 20 | 416 | 10:51 |
| KOSP | May05 | 50 | P | 0.75 | 10 | 192 | 10:51 |
| KOSP | May05 | 40 | C | 13.60 | 10 | 10 | 10:50 |
| KOSP | May05 | 50 | P | 0.85 | 2 | 78 | 10:49 |
| KOSP | May05 | 50 | C | 4.50 | 5 | 486 | 10:49 |
| KOSP | May05 | 50 | P | 0.80 | 2 | 182 | 10:43 |
| KOSP | May05 | 45 | C | 9.10 14 | 11 | 1412 | 10:43 |
| KOSP | June05 | 55 | C | 2.85 14 | 11 | 1426 | 10:41 |
| KOSP | June05 | 45 | C | 9.60 | 6 | 25 | 10:41 |
| KOSP | June05 | 65 | C | 0.40 | 2 | 16 | 10:41 |

70

Ready.

FROM FIG. 3B

| | | | | |
|---|---|---|---|---|
| 15 | 18.60 | 18.90 | 10 | 10:55 |
| 10 | 18.50 | 18.60 | 5 | 10:55 |
| 10 | 18.50 | 18.60 | 10 | 10:55 |
| 10 | 4.40 | 4.50 | 50 | 10:55 |
| 11 | 1.90 | 1.95 | 29 | 10:53 |
| 90 | 0.65 | 0.70 | 10 | 10:52 |
| 10 | 0.75 | 0.90 | 10 | 10:52 |
| 10 | 1.55 | 1.65 | 9 | 10:51 |
| 10 | 0.75 | 0.90 | 10 | 10:51 |
| 10 | 13.60 | 14.00 | 10 | 10:51 |
| 2 | 0.85 | 0.90 | 10 | 10:49 |
| 10 | 4.40 | 4.50 | 5 | 10:49 |
| 22 | 0.75 | 0.85 | 10 | 10:49 |
| 50 | 8.70 | 9.00 | 10 | 10:43 |
| 10 | 2.75 | 3.00 | 10 | 10:41 |
| 10 | 9.20 | 9.60 | 10 | 10:41 |
| 20 | 0.40 | 0.55 | 10 | 10:41 |

FROM FIG. 3C

METHOD AND APPARATUS FOR DISPLAY OF DATA WITH RESPECT TO A PORTFOLIO OF TRADABLE INTERESTS

CROSS-REFERENCE TO RELATED APPLICATIONS

This application claims the benefit of U.S. Provisional Patent Application Ser. No. 60/678,016, filed May 5, 2005, and also claims the benefit of U.S. Provisional Patent Application Ser. No. 60/700,677, filed Jul. 19, 2005, which are both incorporated herein by reference.

BACKGROUND OF THE INVENTION

1. Field of the Invention

The present invention relates generally to a method and apparatus for computer display of information relating to certain tradable interests and, in particular, to a method and apparatus for display of information with respect to investment instruments, such as options or the like, traded on an exchange.

2. Description of the Related Art

Most people are familiar with stocks as a share of a company and know that stocks are traded on an exchange. Stocks are also known as equities, where equities are generally classified as "listed"; implying that they trade in a regulated exchange environment (like the New York Stock Exchange or Philadelphia Stock Exchange), or "OTC" (over the counter) which implies that they trade over-the-counter (between NASD member firms in a less regulated dealer-to-dealer network). Listed stock symbols are made up of three or fewer letters (i.e. TYC) whereas OTC stocks have at least four letters (i.e. MSFT). Regional exchanges in recent years have begun to list OTC stocks as their volumes have increased. Typically, listed stocks are viewed as more liquid since they are serviced by a Specialist in an exchange environment who is responsible for providing a fair and orderly market at all times. However, the proliferation of electronic communications networks (ECNs) has narrowed the distinction between listed and OTC stocks.

In addition to equities, debts, such as bonds, are another type of investment instrument or security. Trading is also conducted in options and futures. The term "option" is short for option contract, which is a securities contract which conveys to its owner the right, but not the obligation, to buy or sell a specific amount of a particular stock, commodity, currency, index, or debt, at a specified price on or before a given date. An option to buy is referred to as a call option, or simply a call, and an option to sell is referred to as a put option, or simply a put. The price specified in the option contract is referred to as the strike price, or sometimes the exercise price. For stock options, the amount of an option contract is usually 100 shares.

Each option has a buyer, called the holder, and a seller, known as the writer. If the option contract is exercised by the holder, a writer is responsible for fulfilling the terms of the contract by delivering the shares to the holder. In the case of a security that cannot be delivered, such as an index, the contract is settled in cash.

Options are most frequently used as either leverage or protection. As leverage, options allow the holder to control equity in a limited capacity for a fraction of what the shares would cost. The difference can be invested elsewhere until the option is exercised. There are listed options on thousands of stocks, some of which are more heavily traded than others. Dealers make markets in many options at a time. The more options managed, the more the dealer grows his or her business.

The term "futures" are short for futures contract, which is an agreement to make or take delivery of a commodity, bond, security or stock index at a specified future time and price. Futures contracts are traded on individual U.S. equities.

Many variations on options and futures have been developed. Equities, commodities, options, and futures, as well as other derivative securities and investments and the like are included in the term tradable interests.

A liquidity provider is a person who buys and sells tradable interests, often for their own personal account rather than on behalf of a client. A liquidity provider may also be a person who buys and holds these interests for a short period of time with the goal being to profit from short term gains in the market. A liquidity provider may be an options exchange member who makes bids and offers for his or her own account. A liquidity provider may in some instances be referred to as a trader, a market maker, or a local dealer.

Trading is conducted by all liquidity providers placing bids and/or offers, where a bid or bid price is the highest price that a liquidity provider is willing to pay for a given security at a given time. An offer or ask price is the lowest price that the liquidity provider will sell a security or commodity for.

In order for there to be a market for a tradable interest, there needs to be a person to buy and a person to sell. Markets are enhanced by people willing to step in and buy when there is no natural buyer or sell when there is no natural seller. People that do this in an exchange or exchange-like environment are often referred to as market makers, and are also considered liquidity providers. The prices at which they are willing to transact are called quotes.

A quote is a price and size at which the liquidity provider is willing to initiate a trade. The price and size at which the liquidity provider is willing to buy is the bid and bid size and the price and size at which the liquidity provider is willing to sell is the ask or offer and ask size or offer size. Ask and offer refer to the same thing. The difference between the bid price and the ask price is the bid/ask spread, also referred to simply as the spread.

For the market maker-type liquidity providers, the objective is to engage in as many transactions as possible at the liquidity provider's price to capture the spread. To be able to participate in a large number of transactions, the liquidity provider must monitor large amounts of data from the exchange or exchange-like environment. Liquidity providers will often monitor or participate in trading on thousands of tradable interests at the same time. The information being monitored is received from one or more exchanges and represents the quotes of many liquidity providers and transactions that have taken place. For active tradable instruments the information can change rapidly. The trading information is displayed on display screens, such as computer screens or the like.

Liquidity providers who disseminate and/or monitor option quotes on many stocks simultaneously have a difficult time monitoring prices for more than a small number (or maybe even from one) of those option classes at any one time since each stock has one or more pages of options quotes and the liquidity providers typically have a limited amount of screen space. Even if the liquidity provider is able to monitor many screens simultaneously, it is extremely difficult to quantify which quotes present the best trading opportunities Trading organizations that evaluate real-time market data are forced to process a mammoth amount of quote information. One can only view a page of information at one time and users are limited in terms of the number of screens that are available to monitor the market information that applies to the portfolio of tradable interests with which they have a trading interest. Only a small portion of all option quote information relates to a single portfolio and only a small portion of those quotes are relevant to a liquidity provider. Further, based on the speed in which quotes change, the information may only be relevant for fractions of a second.

Liquidity providers are able to observe trades reported to market data vendors in a simplistic fashion now that provides very little information beyond the price, quantity, time and exchange origin of a transaction. This information is marginally valuable in its raw form.

SUMMARY OF THE INVENTION

The present invention provides a computer program for generating a display of information from one or more exchanges or exchange-like environments for use by a liquidity provider, to a system using the computer program, and to a method for display of the information for a liquidity provider. The computer program, system and method enables a liquidity provider to view trades, for example options trades, that have occurred. The trades are filtered according to the various criteria, including for example showing trades that are on options in the liquidity provider's portfolio, indicating a trade price in relation to a prevailing bid or offer that and showing trades of greater than a certain size. In addition, trades that may not be of interest can be filtered from the display. The liquidity provider viewing this displayed information can learn important information about the recent history of the market and thereby gain a better understanding of expected market direction.

For the purpose of this specification, a liquidity provider includes any person or entity that buys or sells a tradable interest or represents or is an agent for a person or entity that buys or sells a tradable interest.

DETAILED DESCRIPTION OF THE PREFERRED EMBODIMENTS

Figure 1:
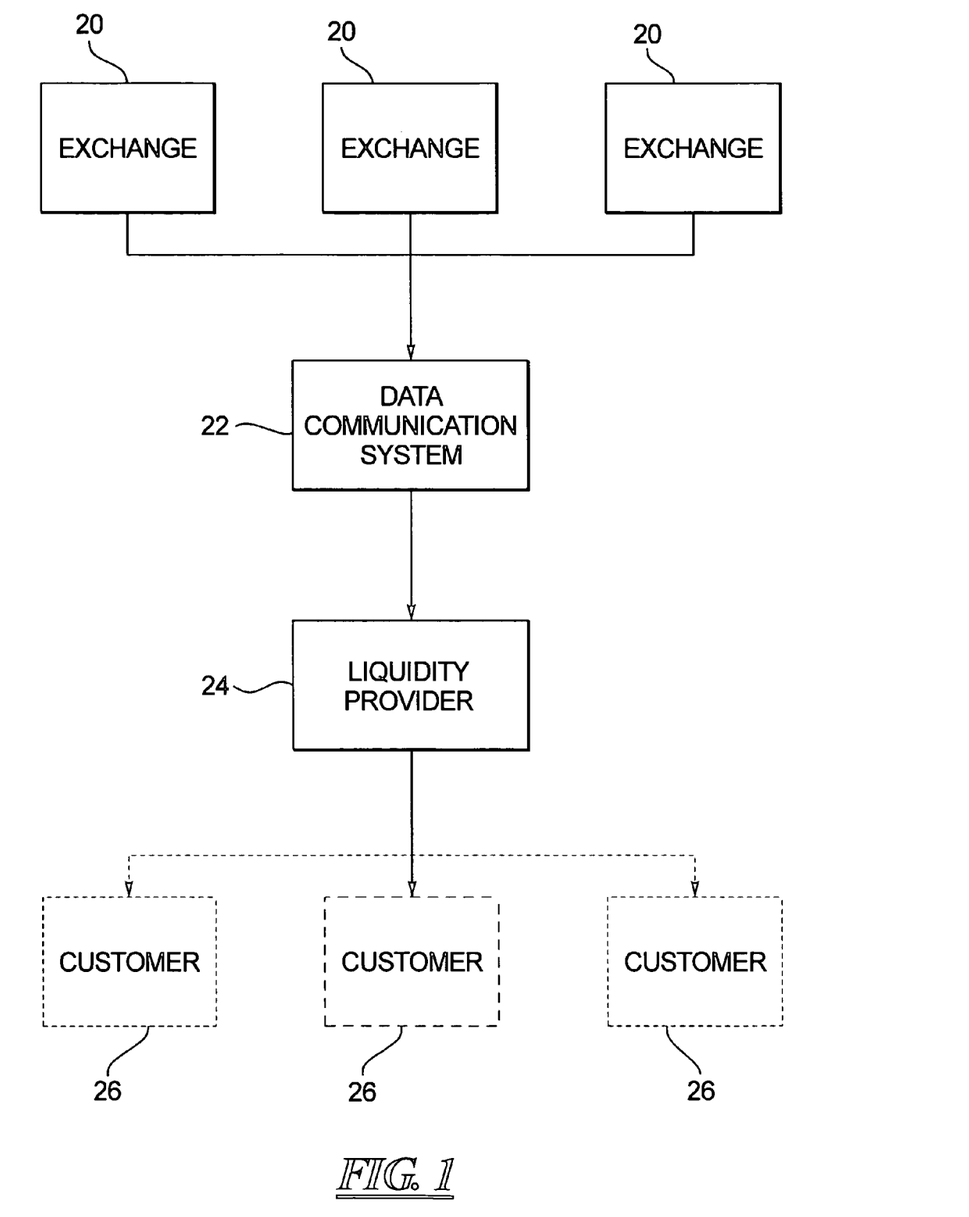
FIG. 1 is a functional block diagram showing communications between a liquidity provider and exchanges.

With reference to FIG. 1, a number of exchanges 20 are available on which are traded tradable interests. An exchange is an organization, association or group which provides or maintains a marketplace where securities, options, futures, or commodities can be traded. The exchanges 20 may be electronic exchanges or open outcry exchanges, or may use some other trading system. The information from the exchanges 20 is connected to one or more data communication systems 22, such as networks, telecommunications systems, quote distribution facilities, and other communications systems. The data communications systems transmit the data provided by the exchanges 20 for distribution to liquidity providers 24. The data communications systems may include a single data transfer path or multiple data transfer paths or multiple systems that provide for the two way transmission of the data between the exchange and the liquidity provider 24. The data communications systems 20 are preferably secure transmission systems that prevent interception or tampering with the data. For a liquidity provider located near to one particular exchange 20 and farther from other exchanges, the data communication system may include two parts, one part connected to the local exchange 20 and the other part connected to the more remote exchanges. It is also possible that a separate connection may be provided between the liquidity provider 24 and each of the exchanges 20 or that any combination data communications with the exchanges 20 may be provided.

The data from the exchanges 20 is utilized by the liquidity provider 24 for monitoring the market and for making trades. The trades may be made by the liquidity provider 24 as a principle agent for customers 26 or for the liquidity provider's own account. For instance, the liquidity providers 24 may have several customers 26 for which the liquidity provider is making trades, monitoring the market, etc.

Figure 2:
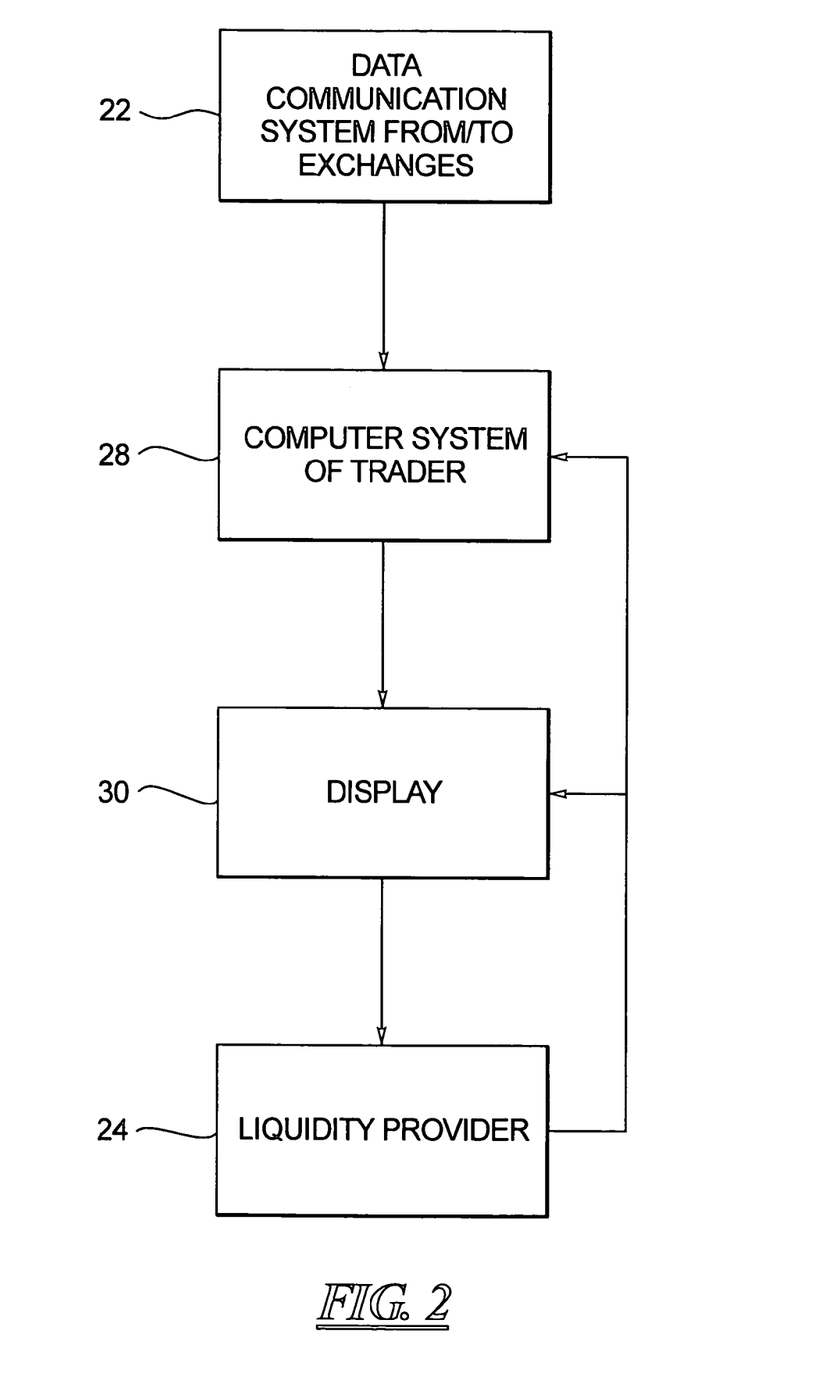
FIG. 2 is a functional block diagram showing a liquidity provider and the liquidity provider's computer system.
Figure 3A:
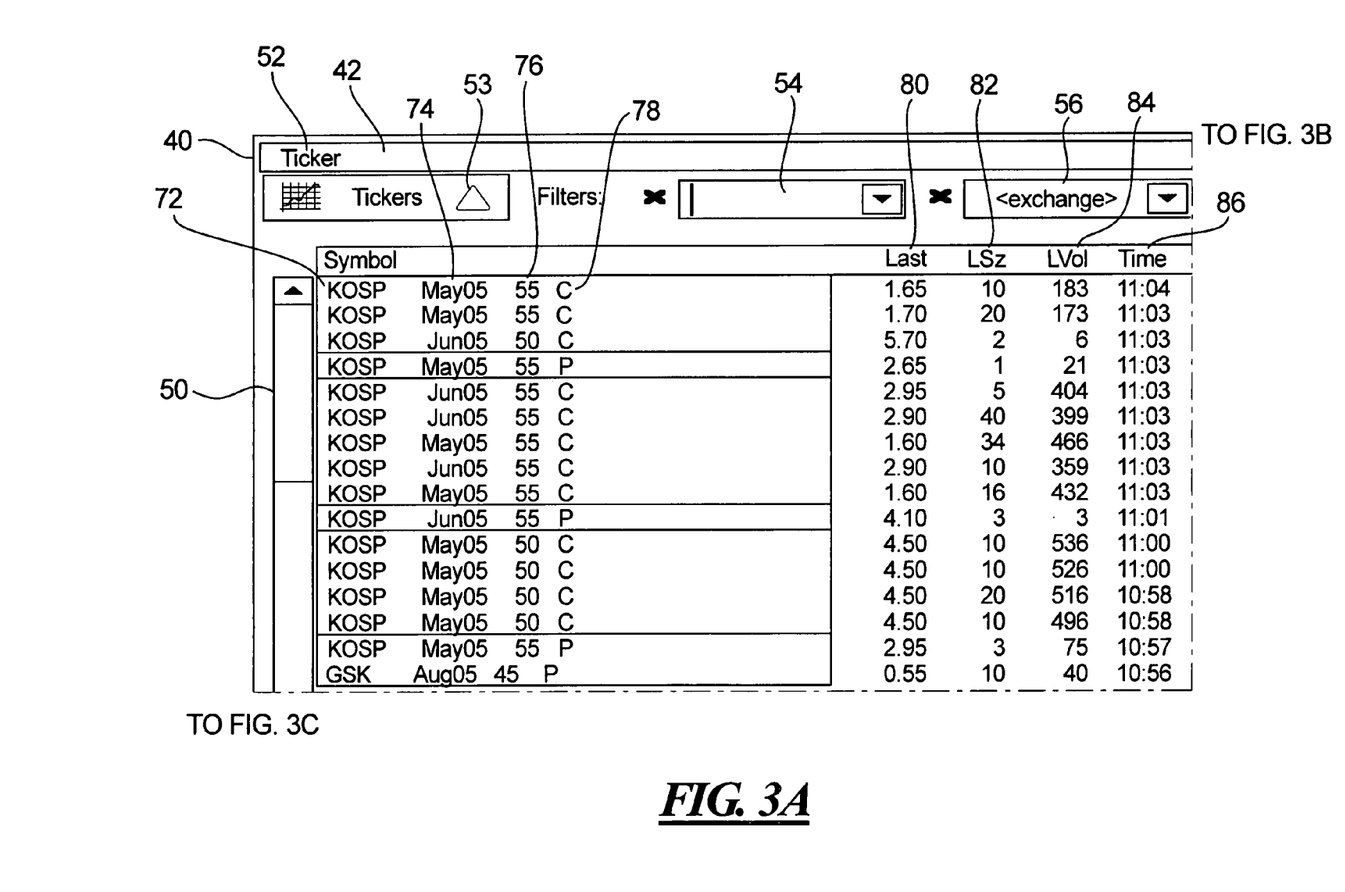
FIG. 3 is a screen shot of an option block ticker window according to the principles of the present invention.
Figure 3B:
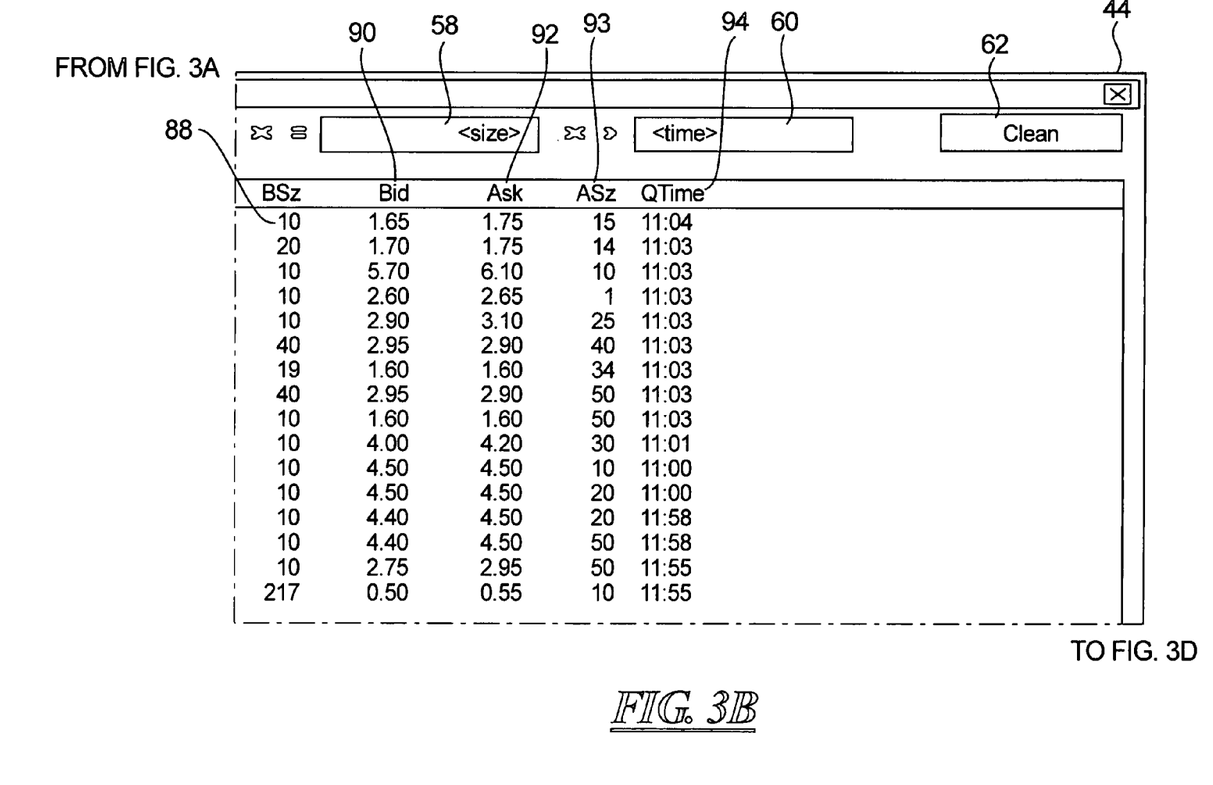
Figure 3C:
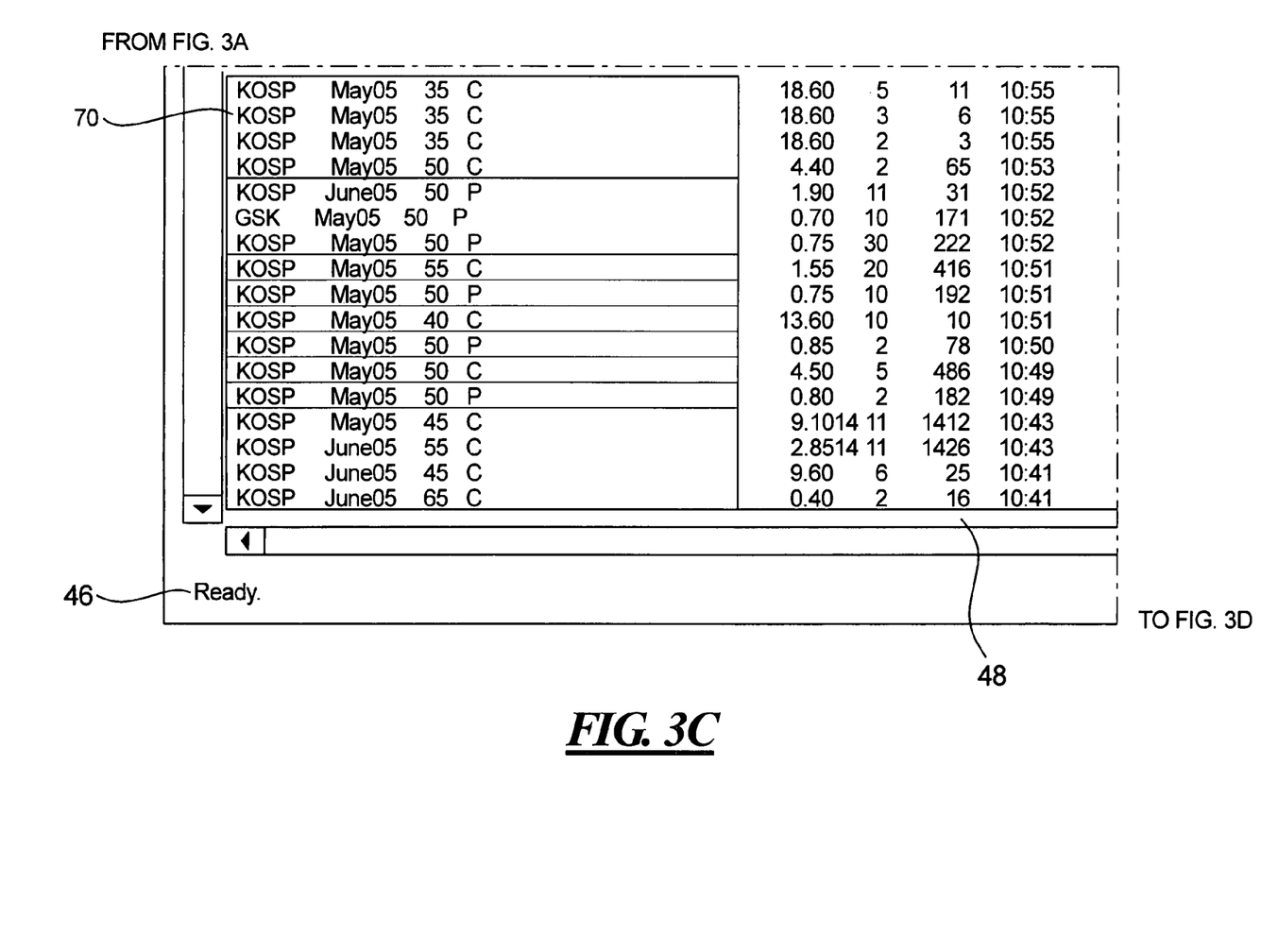
Figure 3D:
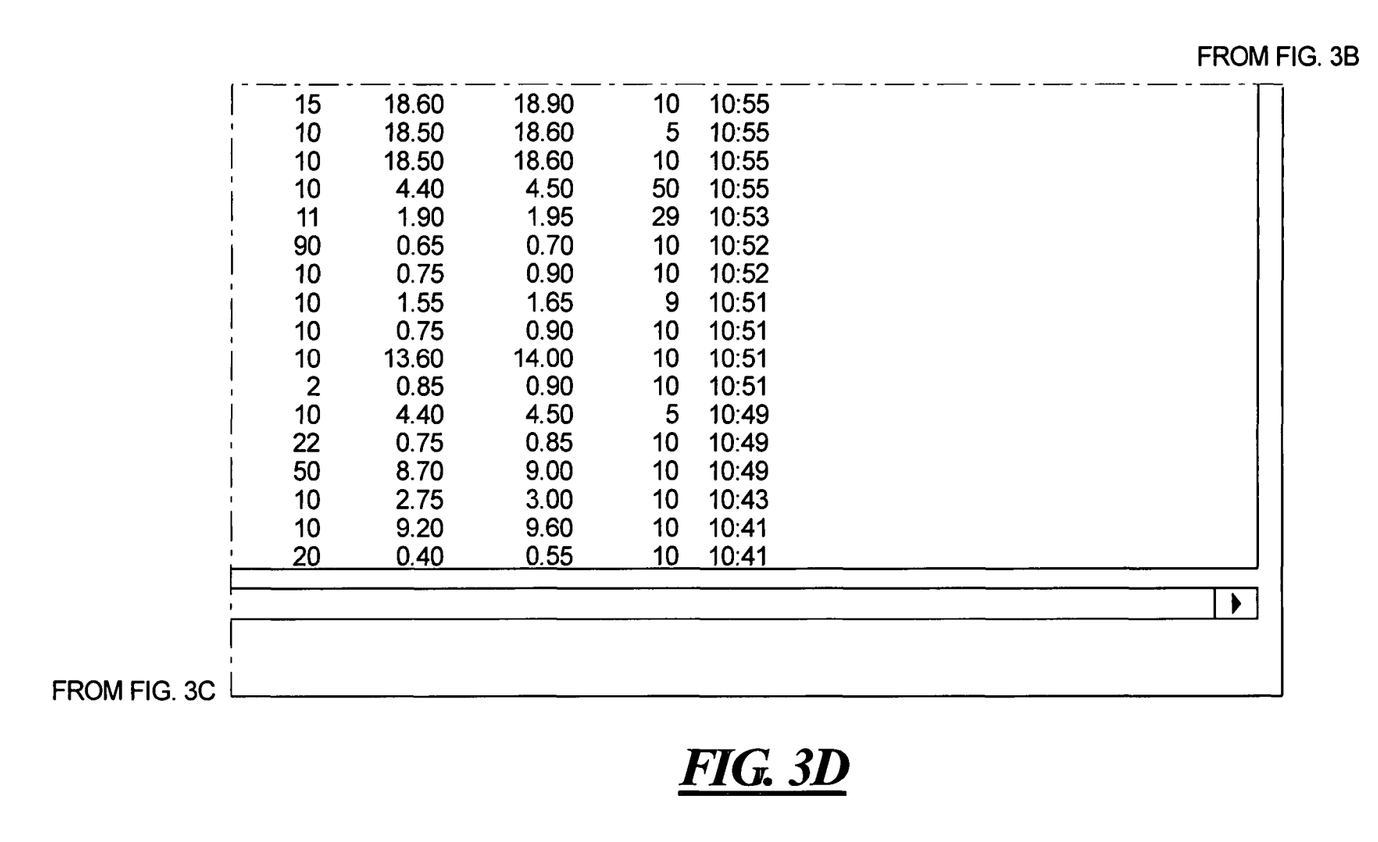

The exchanges 20 generate significant amounts of data. For instance, current message quote volume on the major domestic equity and options exchanges results in up to 200,000 messages per second. The messages include both quotes and trades. It is expected that message volume will increase exponentially for the foreseeable future. The liquidity provider 24 who wishes to utilize the data effectively must have a system to process the volume of data. In FIG. 2, the data from the exchanges 20 is provided to a computer system 28 of the liquidity provider 24 or that is provided for the liquidity provider's use. The computer system 28 has a display 30 and has software to assist the liquidity provider 24 in viewing the data. Many liquidity providers utilize more than one display screen to show the trading data. For instance, the liquidity provider 24 may choose to utilize two, three, four, six or even eight screens to show various aspects of the data and other information that the liquidity provider considers as important for trading. The display 30 may therefore refer to a single display screen or to multiple screens. The computer system 28 may be a stand alone computer or may include a network of connected user computers, server computers and other associated network devices. If the liquidity provider 24 works with a trading firm, the trading firm most likely provides a network with the connection to receive the exchange data and provide it to the computer application of the liquidity provider 24.

The data received from the exchange includes information on quotes (the elements of the quotes are symbol, bid, offer, size of bid, size of offer, time, and exchange origin) and information on trades (the elements of which are symbol, price, trade size, and exchange origin). Market data vendors generally provide software to view this data but only very little information is shown per trade by this software and then too many items of the information are displayed to be of much use to the liquidity provider. According to the present method and software, however, the data is displayed in a way to be of the most benefit to the liquidity provider.

In the preferred embodiment, an option block ticker display window 40 is provided, as shown in FIG. 3. The illustrated embodiment is a display for displaying on a display screen or other viewing media. The currently preferred version of the display is configured for operation in a windows-type operating system, or windowing system, having a graphical user interface, such as Microsoft Windows, although other operating systems are also possible and are included herein. The display may occupy some or all of the display screen and may even occupy multiple display screens, and the display includes elements from the windows-type operating system, including a rectangular visual area with a user interface having a title bar 42, a close button 44, a status bar 46, and horizontal and vertical sliders 48 and 50. These are common windowing system elements and further information on their use may be obtained by reference to current computer literature.

Figure 4:
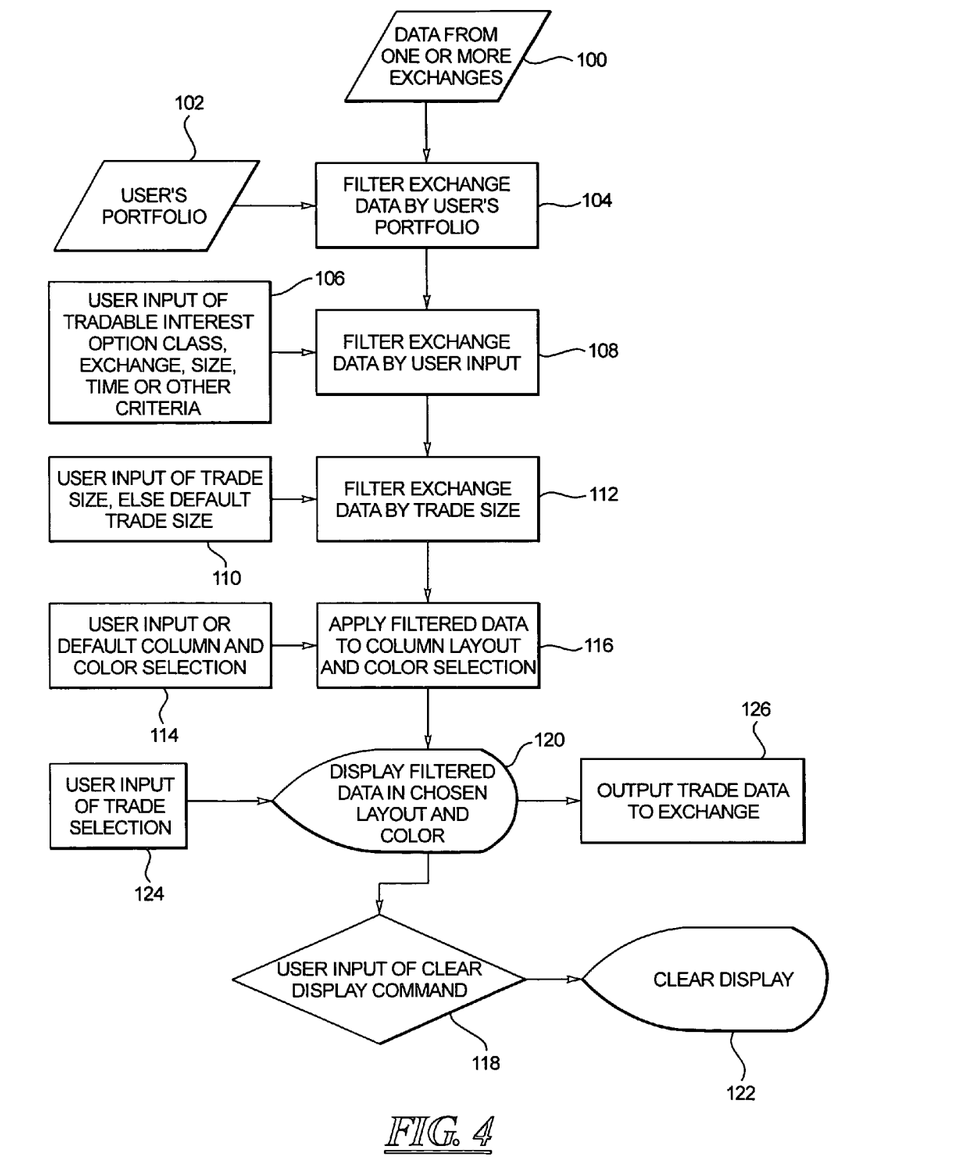
FIG. 4 is a flow chart of the data operations in one example of the display.

Below the title bar 42 is an arrangement of controls, including a ticker selection button 52, filter windows 54, 56 58 and 60, and a clean function button 62. The ticker button 52 enables a user to select securities in the user's portfolio to monitor option activity. To accomplish this, the present system and method obtains information on which tradable interests the user has in a trading portfolio and in the preferred embodiment, presents only these choices for the user to view. A triangle symbol 53 is provided adjacent the ticker selection button 52 that opens a menu by which the user may add or delete columns in the display. A fanciful symbol to indicate to the user that the user is viewing the block option ticker window is shown to the left of the ticker button 52. In FIG. 4, the data 100 from one or more exchanges is received and information on the user's portfolio 102 is provided to filter the exchange data, at 104. The illustrated filtering steps may be applied in another order than shown here.

In FIG. 3, the user may select one, several or all of the tradable interests in the portfolio to view in the window 40. The filter window 54 has a pull-down selector that enables the user to filter the view by tradable interest name. Tradable interests may be individually selected for viewing. For example, the view may be filtered by option class, which is the same as the stock name of the underlying security for the derivative investment. The user may filter by security, by exchange, by size or by time by selecting the term from the pull down list or typing in the relevant information and filtering the option activity by individual security name. In FIG. 4, the user input 106 relating to the tradable interest, option class, exchange, size, time or other criteria is input, and a filtering step 108 is performed on the exchange data.

In FIG. 3, the filter window 56 has a pull-down selector and enables a user to filter by an exchange, such as a national exchange. The exchanges from which data is being received are listed in the pull-down and may be selected by the user. Once selected, only the data of the selected exchange is displayed. The filter window 58 provides a quantity operator filter by which the trading data can be filtered by the quantity of the activity. For example, the displayed data may be filtered to display only trades or other activities involving greater than 75 contracts, or equal to 100 contract, or less than 1000 contracts. The mathematical operators >, <, and = are used, for example. With reference to FIG. 4, the user may either input a trade size and a mathematical operator, at 110, or the system provides a default size value to eliminate the smaller trades that could interfere with an evaluation of the market. The size value is used to filter the exchange data, at 1112. As noted above, the filtering steps can be applied in a different order and it may be beneficial to filter by size sooner in the process.

Referring back to FIG. 3, the filter window 60 enables the user to filter the displayed results by time. Trading activity prior to, at, or after an input date is displayed. The user may input any date or may otherwise input date information, such as "last month", or "year to date" for filtering the displayed data. The clean function button 62 enables the user to erase all activity displayed in the window so that the screen is available to view new trading activity. After activation of the clean button 62, the display shows only new trade data. The clean command is shown in FIG. 4 at 118.

In FIG. 3, inside the display window 70 itself, the trade data is displayed in row and column format. The rows represent individual activities, such as trades and the columns represent various information about the activities. From the left, the first column 72 is the security symbol for the underlying security, in the present example. The second column 74 is the expiring month for the option. In the third column 76 is shown the strike price, or exercise price, of the option. The fourth column 78 has an indicator of either "C" or "P" to indicate if the activity is a call or a put. As a further indicator of the put or call status, the row is indicated in different colors for the two classes. For example, a call is displayed with a blue background and a put is shown with a red background. The user may thus readily distinguish puts and calls from one another.

Continuing to the right, the columns of the illustrated embodiment include: Last (reference number 80), a last trade price for this option; LSz, a quantity of the last trade (reference number 82), a ticker; Lvol (reference number 84), a total daily volume for that series on a particular exchange; Time (reference number 86), a time stamp indicating the time when the executed trade was reported on the ticker; BSz (reference number 88), the size for the best bid at the time of the trade. Bid (reference number 90), the best bid for the option at the time of the trade; Ask (reference number 92), the best offer for the option at the time of the trade; Asz (reference number 93), the size for the best offer at the time of the trade; and Qtime (reference number 94), the time stamp for the bid and offer at the time of the last trade. Color codes for the text displayed in the columns indicate the exchange from which the data is obtained. For example, trade data from one exchange may be displayed in green, another exchange in red, and another exchange in blue. In the preferred embodiment the Time 86 and QTime 94 columns are of a constant color such as yellow for the entire column.

These columns and colors are examples of a default layout of the filtered data of a preferred embodiment. The default layout is shown in FIG. 4 at 114, where it is applied to the filtered data at 116, resulting in the display 120 of the data for the user or liquidity provider. The display 120 is updated substantially constantly as new data is received from the exchange. To clear the screen of old data and display only the new, changed data, the clear display command 118 is selected by the user and the display is cleared 122 of the displayed data. New filtered data is received from the exchanges and is displayed as noted in the foregoing.

As an optional feature, the user may input a trade through the display, as shown at 124, such as by selecting an item displayed on the screen. Alternately, the liquidity provider or user may input a trade another way into the present software or by using a different software package. The trade is forwarded to the exchange at 126.

More or fewer columns may be provided. For example, in one embodiment added columns display the current stock price (for the underlying security), the implied volatility of last trade, and the implied volatility level of the bid and of the offer. Fewer columns may be displayed so that the display is clearer and more easily understood quickly.

The option block ticker window 40 displays consummated trades in options, also referred to as option contracts, in the illustrated embodiment, although it is contemplated and within the scope of the present invention to display trades in other tradable interests instead, or in addition to, the option trades. In one embodiment, only large trades, or blocks, for example, over 50 contracts, are displayed. The display of the present embodiment displays only data relating to consummated transactions where the display shows the transaction prices and sizes in relation to the prevailing market quotes (the bid, offer, size information) at the time of the consummated transaction. A key concept is that the data is displayed in comparison.

The displayed information is obtained from data sent by one or more exchanges. Thus, for the present embodiment the data relates to an exchange traded option. Exchange traded options are a type of exchange traded derivative that uses standardized contracts, systematic pricing, and are settled through a clearing house. It is also possible that the present method could be utilized with tradable interests that are not traded on an exchange. The present method may be applied to an ECN (an electronic communications network), to alternative trading systems, to event contracts, or even to betting contracts such as sports betting or the like.

According to aspects of the invention, the block option ticker 40 provides a system that scans a market data source for transaction data relevant to a specific portfolio and incorporates the transaction data into an analysis tool that utilizes the data in conjunction with other market data and proprietary valuation processes to render a view of current implied volatility, and the direction of implied volatility (in other words, supply and demand) measurements in relation to recent market conditions as well as historical market conditions. The system allows a user to filter for specific option transaction quantities, stock symbols, expiration months, calls/puts, transaction times. The system enables the user to develop a view of supply and demand relative to current market prices. The system also measures the trade price in relation to the prevailing bid and offer in the market at the time the transaction was reported in order to measure the direction of implied volatility in the marketplace. A user can apply qualifying parameters to market data, such as bid/offer size and exchange origin, to filter out less meaningful bids and offers from the analysis.

Thus, the screen shot of FIG. 3 provides a display showing investments, here exchange traded options, listed in an ordered list. The display screen presents the elements filtered by the filters provided according to the preferred embodiments, including the portfolio filter, the security filter, exchange filter, quantity filter, and time filter. The display provides color coding for ready identification of puts, calls, exchanges, etc. Far more information is displayed for the trades shown in the filtered display to enable a liquidity provider to maximize the benefit of reviewing the trade information.

Another embodiment of the present display provides added columns showing the user's bid and ask for a tradable interest. A further feature shows the trade relative to the bid and ask.

A comparison of market prices to transaction prices may be made. The market information is displayed in the most useful way for the user. The last trade price and size is shown relative to the bid and offer at the time of the trade.

As a market becomes more efficient, the liquidity provider needs to trade more product to make up in volume what is lost in profits per trade. The present computer program and method enables the liquidity provider to more effectively and quickly track and trade a greater number of tradable interests. In particular, the present display helps the liquidity provider to decide if he or she should move his or her quote on a particular tradable interest.

Although other modifications and changes may be suggested by those skilled in the art, it is the intention of the inventors to embody within the patent warranted hereon all changes and modifications as reasonably and properly come within the scope of their contribution to the art.

I claim:

1. A method for display of trading information from an exchange for a user, comprising the steps of:
   receiving exchange data including trading information on a computer via a connection from the exchange for a plurality of tradable interests;
   receiving data identifying tradable interests in the user's portfolio, said receiving step being performed by the computer;
   filtering said exchange data using the computer to remove data on tradable interests not in the user's portfolio to provide filtered exchange data;
   receiving user input filter criteria, said user input filter criteria including at least one of: portfolio member, exchange, security, time, and size;
   applying said user input filter criteria to the filtered exchange data;
   further filtering said filtered exchange data using the computer so as to remove data for transactions below a predetermined threshold wherein said threshold is a predetermined trade size to provide threshold filtered exchange data; and
   from said threshold filtered exchange data, displaying on the computer only data related to consummated transactions of tradable interests, said displaying including displaying, with respect to each consummated transaction, prevailing market quotes for the tradable interest at the time of the consummated transaction, said displaying including showing at least: tradable interest identity, last trade price, last trade size, best bid and best offer, and time of the last trade, said displaying step including displaying consummated transactions by others.

2. A method as claimed in claim 1, wherein said trading information on tradable interests is option contract trade information for trades that have occurred on at least one exchange, and wherein said step of displaying includes displaying for each option contract: underlying interest, expiration month, and strike price.

3. A method as claimed in claim 2, further comprising the step of: displaying put data and call data in mutually different colors.

4. A method as claimed in claim 1, wherein said step of receiving trading information receives trading information on tradable interests from a plurality of exchanges.

5. A method as claimed in claim 1, wherein said predetermined trade size is established by user input size criteria.

6. A method as claimed in claim 1, further comprising the step of: displaying data from different exchanges in different colors.

7. A tangible computer readable media on which is stored a program that includes a user input to accept filter data, said program being operable on a computer to perform a method comprising the steps of:
   receiving exchange data including trading information from an exchange for a plurality of tradable interests;
   receiving data identifying tradable interests in the user's portfolio;
   filtering said exchange data to remove data on tradable interests not in the user's portfolio to provide filtered exchange data;
   receiving user input filter date for at least one of the following set of filter data: portfolio member, exchange, security, time, and size;
   filtering said exchange data to remove data on trades below a predetermined threshold of size of trades; and
   from said filtered exchange data displaying only data related to consummated transactions of tradable interests, said displaying including displaying with respect to each consummated transaction prevailing market quotes for the tradable interest at the time of the consummated transaction, said displaying including showing at least: tradable interest identity, last trade price, last trade size, best bid and best offer, and time of the last trade, said displaying step including displaying consummated transactions of others.

8. A computer readable media as claimed in claim 7, wherein said trading information is option contract trade information for trades that have occurred on at least one exchange.

9. A computer readable media as claimed in claim 8, further comprising the step of: displaying put data and call data in mutually different colors.

10. A computer readable media as claimed in claim 7, wherein said step of receiving trading information receives trading information from a plurality of exchanges.

11. A computer readable media as claimed in claim 7, wherein said predetermined threshold of size of trades is established by user input trade size filter criteria.

12. A computer readable media as claimed in claim 7, further comprising the step of: displaying data from different exchanges in different colors.

13. A system, comprising:
a computer apparatus; and
computer recordable media operably connected to said computer apparatus and on which is stored computer software that includes a user input to accept filter data for at least one of the following set of filter data: portfolio member, exchange, security, time, and size, said computer software being operable on the computer apparatus to perform the method comprising the steps of:
receiving exchange data including trading information from an exchange for a plurality of tradable interests;
receiving data identifying tradable interests in the user's portfolio;
filtering said exchange data to remove data on tradable interests not in the user's portfolio;
filtering said exchange data to remove trade data below a predetermined threshold of trade size to provide filtered exchange data; and
from said filtered exchange data displaying only data related to consummated transactions of tradable interests, said displaying including displaying, with respect to each consummated transaction, prevailing market quotes for the tradable interest at the time of the consummated transaction, said displaying including showing at least: tradable interest identity, last trade price, last trade size, best bid and best offer, and time of the last trade.

14. A method as claimed in claim 1, wherein the exchange data received on the computer includes data on thousands of quotes per second, and wherein said step of displaying is performed substantially in real time.

15. A method for display of trading information from an exchange for a user, comprising the steps of:
receiving exchange data including trading information on a computer via a connection from the exchange for a plurality of tradable interests;
receiving data identifying tradable interests in the user's portfolio, said receiving step being performed by the computer;
filtering said exchange data using the computer to remove data on tradable interests not in the user's portfolio to provide filtered exchange data;
receiving user input filter criteria, said user input filter criteria including at least one of: portfolio member, exchange, security, time, and size;
applying said user input filter criteria to the exchange data;
removing data relating to consummated transactions below a predetermined threshold of trade size from the filtered exchange data to provide display data; and
displaying on the computer only the display data related to consummated transactions of tradable interests at or above the threshold, said displaying including displaying, with respect to each consummated transaction, prevailing market quotes for the tradable interest at the time of the consummated transaction, said displaying including showing at least: tradable interest identity, last trade price, last trade size, best bid and best offer, and time of the last trade, said displaying step including displaying consummated trading information by others.

* * * * *